(12) United States Patent
Kulakov

(10) Patent No.: US 8,173,307 B2
(45) Date of Patent: May 8, 2012

(54) METAL-AIR FUEL CELL AND POWER SOURCE THEREFOR

(75) Inventor: Evgeny B. Kulakov, North York (CA)

(73) Assignee: Altek Capital, Inc, Brooklyn, NY (US)

( * ) Notice: Subject to any disclaimer, the term of this patent is extended or adjusted under 35 U.S.C. 154(b) by 816 days.

(21) Appl. No.: 11/583,938

(22) Filed: Oct. 20, 2006

(65) Prior Publication Data

US 2008/0096087 A1   Apr. 24, 2008

(51) Int. Cl.
*H01M 4/36* (2006.01)

(52) U.S. Cl. ........ 429/405; 429/406; 429/421; 429/469; 429/485; 429/522; 429/523

(58) Field of Classification Search .................... 429/27, 429/32, 34, 35, 44, 405, 406, 421, 469, 485, 429/522, 523

See application file for complete search history.

(56) References Cited

U.S. PATENT DOCUMENTS

| 5,415,949 A * | 5/1995 | Stone et al. ................... 429/63 |
| 6,372,371 B1 * | 4/2002 | Iarochenko et al. ......... 429/406 |
| 2007/0054160 A1 * | 3/2007 | Ovshinsky ..................... 429/13 |

* cited by examiner

*Primary Examiner* — Patrick Ryan
*Assistant Examiner* — Ben Lewis

(57) ABSTRACT

A metal-air fuel cell has electrodes including a cathode and an anode, current pickups provided for each of said electrodes for taking currents from a respective one of the electrode, wherein at least one of the electrodes being formed as a frameless box-shaped element, wherein additional hydrogen electrode, an electrolyte container, and a power source are provided.

12 Claims, 8 Drawing Sheets

A1

A2

METAL-AIR FUEL CELL AND POWER SOURCE THEREFOR

BACKGROUND OF THE INVENTION

The present invention relates generally to power sources and more particularly to metal-air fuel cells, and also to a power source for the same.

Batteries having a metal anode and gas diffusion cathode are known generally as metal air batteries. There are several reasons why metal air batteries work more efficiently if they are provided with electrolyte circulation. The most commonly cited reasons include increase of power output by means of increasing the flow of electrolyte reactive species to and from the electrode surfaces, decreasing the heat buildup in a battery under load by means of conduction of the hot electrolyte to cooler sections of the battery or to external radiative coolers, providing for removal of byproducts solids from the battery by transporting the electrolyte to a solids removal device, and hence, preventing the battery from becoming clogged with solids. The following examples of the prior art show how existing technology has been used to provide for electrolyte circulation within a metal air battery.

STATEMENT OF PRIOR ARTS

U.S. Pat. Nos. 4,908,281 and 5,093,213 teach how a metal air battery may be provided with an external pump to provide electrolyte circulation. A series of manifolds is needed to direct the electrolyte flow to a plurality of individual cells. A check valve prevents reverse flow from the pump and an optional air-cooled heat exchanger is provided in the external circuit. The disadvantage of this technology is that the external pump requires power and increases the cost of the system. Valves and manifolds of the system introduce complexity and increase potential failures. Furthermore the pumping action must be designed for full load conditions and since the pump capacity is fixed and is constant regardless of whether the battery is under full load or under a very small load where pumping may not be required, the power consumption by the pump reduces useful cell output efficiency, considerably.

U.S. Pat. No. 5,582,929 teaches electrolyte circulation between two compartments by means of compressed air to provide cooling of hot electrolyte using external cooling in one of the compartments. This arrangement, while avoiding direct electrical pumping costs, has the complexity of two electrolyte holding tanks and the costs associated with the supply of compressed air.

U.S. Pat. No. 5,376,471 teaches how to provide electrolyte circulation in a metal air battery by means of convection. The advantage of the cell is that a large stagnant electrolyte reservoir beneath the cell allows the reaction byproduct, aluminum hydroxide in this case, to settle out from the electrolyte. As noted in this work, aluminum air cells which operate at high current density (>400 mA/cm2) are subject to short service life because supersaturation of the electrolyte at high current density causes precipitation of aluminum hydroxide at the electrodes and results in passivation, unless active electrolyte management is used. This patent disclosure focuses on low current density cells (5-75 $mA/cm^2$) and solids are allowed to settle by gravity, so that the lack of an external pump is an advantage because there is less fluid turbulence. Sufficient space is allowed around the electrodes such that the spent electrolyte can randomly flow to a bottom sump reservoir. The cell configuration is cylindrical and does not produce an organized increased fluid flow circulation. The generation of fluid flow in the large stagnant electrolyte reservoir beneath the cell is not beneficial since the aluminum hydroxide product would be stirred up and recirculated to the cells. Furthermore, the convective passage of the electrolyte is to the upper surface of the large stagnant electrolyte reservoir beneath the cell. The reason is again to avoid disturbance of the stagnant reservoir which would inhibit aluminum hydroxide settling. Further, it is stated that the aluminum hydroxide is initially gel-like and requires time to crystallize which explains the need to prevent circulation of the stagnant reservoir.

U.S. Pat. No. 5,567,540 teaches how a metal air battery may be provided with an external pump to provide electrolyte circulation. The additional advantage with this system is that a sensor is provided to activate the pumping action. In this manner, the pump is only activated when needed by the cell. U.S. Pat. No. 5,567,540 also describes how the electrolyte may be advantageously filtered in the external pumped circuit. However, this battery still has the disadvantage of the added complexity of the pumping system and sensors and, although the pump is activated only when needed, the pumping consumes power and the pumping rate is fixed and does not match the load of the cell.

U.S. Pat. No. 4,507,367 describes internal electrolyte pumping by means of hydrogen gas pressure and teaches how a metal air cell having a gas producing reaction may be constructed in a hermetic manner to provide for a buildup of internal gas pressure to circulate electrolyte. It is clear that such a device has the disadvantage of having to be hermetically sealed.

U.S. Pat. Application No. 20020034679 Iarochenko, Alexander M. et al. Mar. 21, 2002 "Gas-evolving electrochemical cells"

An electrochemical battery comprising a housing; an electrolyte within the housing; an anode within the electrolyte and the housing and having an anode surface upper portion and an anode surface lower portion; a cathode within the electrolyte and the housing and having a cathode surface upper portion and a cathode surface lower portion at an inter-electrode distance from the anode to operable provide upward laminar flow of the electrolyte from the anode and cathode lower portions to the anode and cathode upper portions; recycle down corner channel means for effecting and allowing of downward gravity flow of an upper portion of the electrolyte from the anode and cathode surface upper portions to provide a recycled lower portion of the electrolyte for recycle to the anode and cathode. The battery structure provides improved cell power performance, reduces unwanted temperature gradients in the cell, provides uniformity of electrolyte concentration and reduces cell passivation. It is clear that such a device has the disadvantage of having to be necessary to connect the pipes to each cell.

U.S. Pat. No. 6,946,210 B2 describes an improved electrochemical polymer electrolyte membrane cell stack is provided that includes one or more individual fuel cell cassettes, each fuel cell cassette having at least one membrane electrode assembly, fuel flow field and oxidant flow field. Within each fuel cell cassette, each membrane electrode assembly has at least one manifold opening for the passage of reactant manifolds through the cassette, all of which are bonded about the perimeter by a sealant, and each flow field has at least one manifold opening and any manifold openings on the flow fields which do not correspond to a manifold providing reactant for distribution to such flow field is bonded about its perimeter by a sealant. Each fuel cell cassette may also contain other typical components of a electrochemical polymer electrolyte membrane cell stack, such as separator plates or coolant flow fields, which also have manifold openings which may or may not be bonded about the perimeter. The membrane electrode assembly, flow fields, and other components are encapsulated along the peripheral edges by a resin such that the entire periphery of the fuel cell cassette is encapsulated by the resin. It is clear that such a device has the disadvantage of having to be assembled by high pressure between end plates.

It is believed that existing fuel cell power sources can be further improved as to their construction, operation, and efficiency.

SUMMARY OF THE INVENTION

Accordingly, it is an object of the present invention to provide an metal-air fuel cell which is a further improvement of the existing cells of this type.

In keeping with these objects and with others which will become apparent hereinafter, one feature of the present invention resides, briefly stated, in a metal-air fuel cell which has electrodes including a cathode and an anode; current pickups provided for each of said electrodes for taking currents from a respective one of said electrode, wherein at least one of said electrodes being formed as a frameless box-shaped element.

Another feature of the present invention resides, briefly stated, in a battery, comprising a plurality of metal-air cell elements each having electrodes including a cathode and an anode; current pickups provided for each of said electrodes for taking currents from a respective one of said electrode, wherein at least one of said electrodes being formed as a frameless box-shaped element.

Another feature of the present invention resides, briefly stated, in a metal-air fuel cell, comprising electrodes including a cathode and an anode; current pickups provided for each of said electrodes for taking currents from a respective one of said electrode, wherein said means is formed as an electrolyte container.

A further feature of the present invention resides in the above-mentioned metal-air fuel cell, in which an additional electrode is provided for utilization of hydrogen generated as a result of a corrosion reaction on the anode.

The novel features of which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
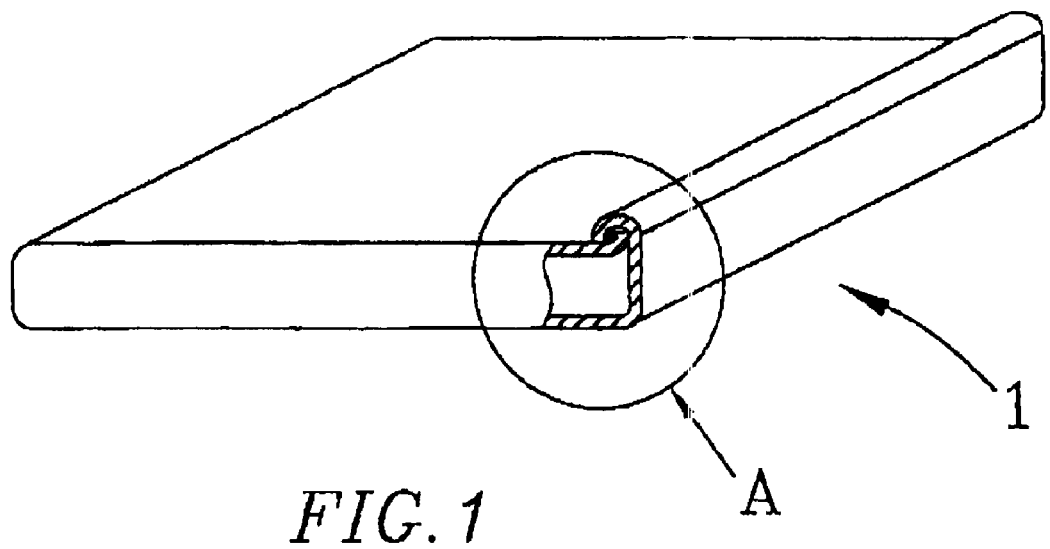
FIG. 1 is a perspective view and FIGS. 1a and 1b are cross-sections of two modifications of a cathode of a metal-air fuel cell in accordance with the present invention.
Figure 1A:
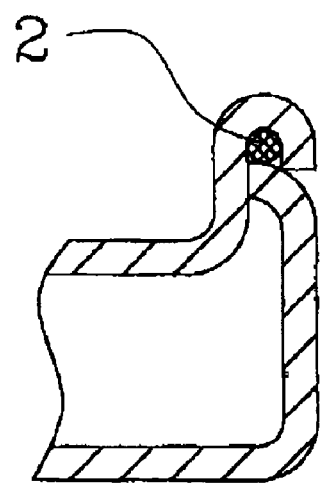

A metal-air fuel cell will be now described in detail, first with respect to its components and then with respect to its general assembly.

The metal-air fuel cell has a cathode which is identified as a whole with reference numeral 1. The cathode 1 is formed as a gas-diffusion electrode based on gas diffusion media as fully disclosed in our U.S. patent application Ser. No. 11/322, 195 filed, which is incorporated here by reference. The cathode is configured as a frameless box. As a result, it is no longer necessary to use exterior power frames, for example in U.S. patent application No. 20020034679. This increases a coefficient of use of the cathode volume $K_d = V_{(external)}/V_{(internal)}$ from 35-50% in the above cited reference to 75-99%.

Figure 1B:
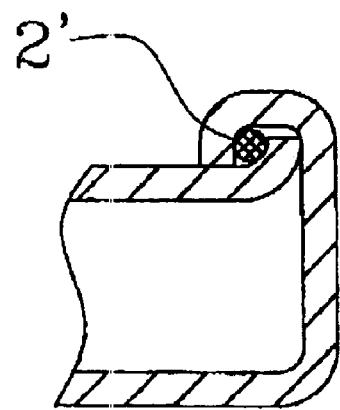

The edges of the gas diffusion element which forms the cathode 1 in accordance with the present invention are hermetically connected with one another as shown in FIGS. 1b and 1c. In FIG. 1b the edges of one longitudinal wall and transverse wall are extended in one direction so as to be parallel to one another, and at the end side of both edges a connecting layer 2, composed for example of adhesive, is provided, for the hermetic connection of the edges.

In another embodiment the edge of the elongated wall is extended in one direction, while the edge of the transverse wall extends in the same direction and then surrounds the first mentioned edge as identified with reference numeral 2'. The edges are connected with one another for example by adhesive provided between the edges and the longitudinal wall.

Figures 2A, 2B:
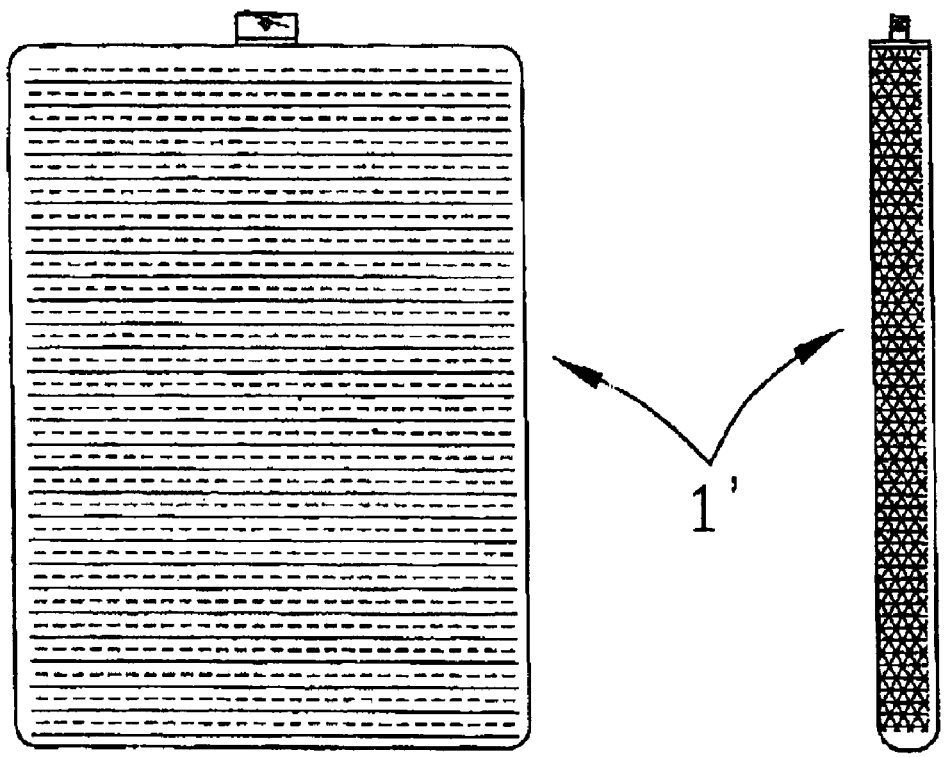
FIGS. 2a and 2b are a front view and a side view showing an anode and FIG. 2c shows a current pick up of the metal-air fuel cell in accordance with the present invention.
Figure 2C:
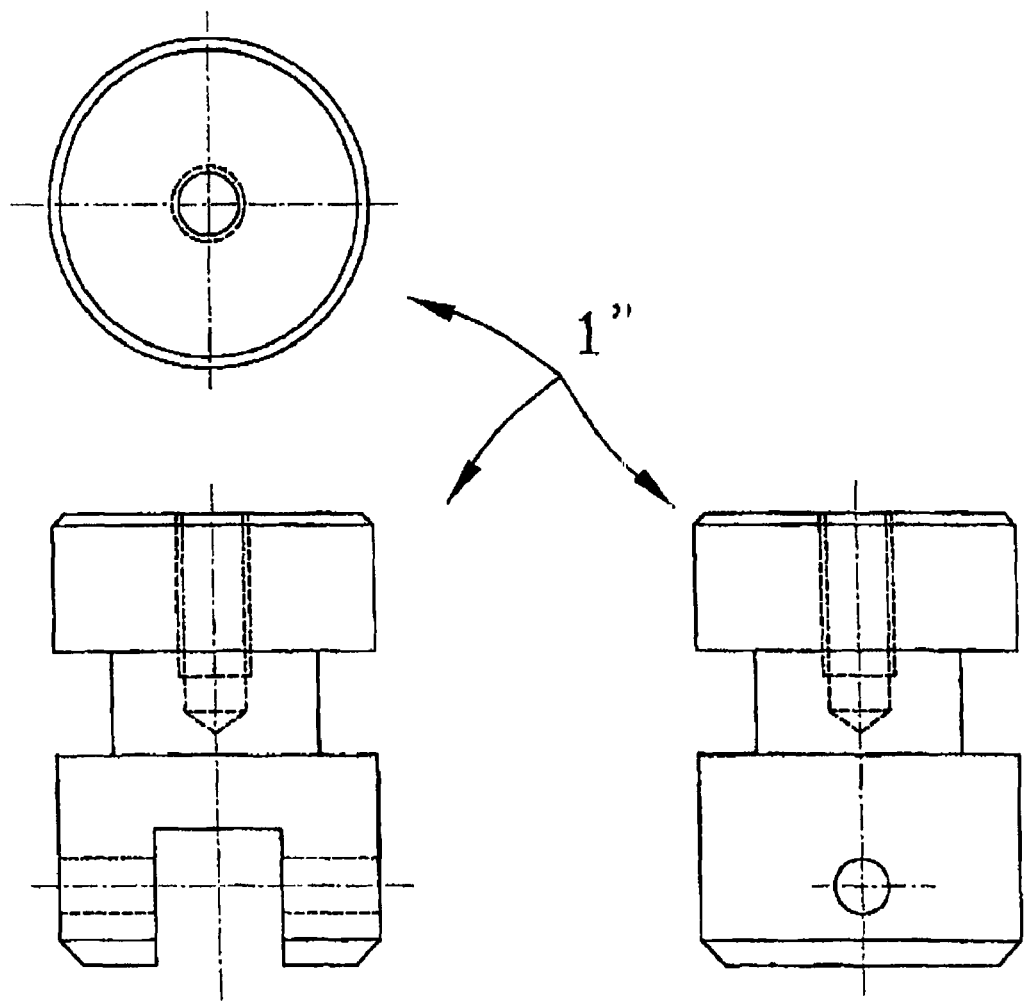

FIGS. 2a and 2b show an anode of the aluminum-air fuel cell of the power source in accordance with the present invention. The anode can be composed of Al, Zn, Mg. Also, technical grade metal can be used, for example aluminum with the purity 99.99%. The anode is identified with reference numeral 1'. A current pickup element in FIG. 2c is identified with reference numeral 1".

The anode is formed as a plate with a thickness 1-10 mm, width 1-500 mm, height 2-500 mm. In the upper part of the plate there is a holder for the current pickup formed as a projection with a thickness equal or less than the thickness of the anode, and the width which is determined in accordance with the formula:

$$B \geq SQRT (I/5 \text{ mm})$$

wherein SQRT—is a function square root;

I—maximum current generated by a battery, for example in this case 30 amp;

5 is maximum density of current which is possible for passage through metal conductors, 5 (amp/mm$^2$).

The current pickup of the anode performs the function of collecting electrons generated on working surfaces of the anode, which contact with electrolyte. It is formed as a cylindrical body shown in the drawing. For providing a reliable mechanical contact over the current pickup with the anode, it has in its lower part a groove with a width equal to the width of the holder of the current pickup of the anode located in the upper part of the plate of the anode. In a transverse direction (through the plate of the anode) the current pickup has an opening through which it is attached to the anode by means of an additional screw with a thread. A current transmission from the current pickup into commutated electrical circuit to output electrical terminals (electrical busses) of a power supply is performed through a body of the current pickup to the upper surface, to which by means of the screw connection an electrical wire is connected.

With such a construction of the anode with the current pickup of the anode, it is possible to provide fast mounting of the anodes in the beginning of the operation of the power source and to provide fast replacement of the anodes after their complete use in the current source without technological wastes.

The metal-air fuel cell in accordance with the present invention has an electrolyte composed of aqueous solutions of alkali Kolt, NaOH or salts NaCi or their mixtures with a concentration of 0.1-8 M preferably 4-6 n. Additives can be introduced including ethylene glycol (0.1-15 weight percent), starch (0.1-15 weight percent) and also salts of tin (0.01-1.0 weight percent) indium (0.01-1.0 weight percent), lithium (0.10-1.0 weight percent) and calcium (0.01-1.0) weight percent.

The electrolyte performs the function of a conductor of second order and possesses conductivity, for example hydroxyl ions (OH) for performing current generating reaction:

1. Electricochemical: $4Al-3O_2+6H_2O+=4Al(OH)_3$
2. Anode reaction: $4Al^{3+}-12e^-+12OH^-=4Al(OH)_3$
3. Cathode reaction: $3O_2+6A_2O+12e^-=12(OH)$.

Electrons released on the anode (reaction 2) pass through the pickup of the anode and exterior circuit of load to cathode.

For closing of this electrical circuit hydroxyl ions generated on the cathode (reaction 3) pass through the electrolyte to the anode, and the current generating reaction 1 as a result is closed on carriers of electrical charges. For performing the functions of the electrolyte, the electrolytes with above specified composition are utilized. In particular, electrolytes based on aqueous solutions of alkali KOH or NaOH or their mixture with additives for improving energy or application characteristics of the current source or utilized. It is also possible to use electrolytes based on neutral aqueous solutions, for example NaCl. In this case conductivity based on chloride ions Cl with formation $AlCl_3$ as a final product of the reaction is provided instead of $Al(OH)_3$ as in the previous case with alkali electrolyte.

For preparation of the electrolyte the following components can be utilized, which are soluble in aqueous solutions:

$H_2O$-water used as a solvent,

KOH-potassium hydroxide, used for creating in the solution of a given level of alkali and also used as an admixture for improving solubility of aluminates ions which are product of reaction of anodic dissolution, from a surface of the anode, with concentration 0.1-8 M/L, preferably 3-6 M/L NaOH-sodium hydroxide used for producing in the solution of a given level of alkali with concentration 0.1-8 M/L, preferably 3-6 M/L NaCl-sodium chloride used as an inhibitor of a reaction of corrosion of anode, and optimization of electrical conductivity of the electrolyte with a concentration 1-15 weight percent, preferably 5-10 weight percent.

$CH_2OHOH_2OH$-mono atomic alcohol as an ethylene glycol (ethylene alcohol) used as an admixture for reducing evaporation of water from electrolyte in the process of discharge of current source with a concentration 0.1-15 weight percent preferably 1-5 weight percent.

$C_6H_{12}O_6$-D glucose (starch) used as a mixture into the electrolyte for improvement of deposition Al $(OH)_3$ from the solution into a phase of solid deposit, with a concentration 0.1-15 weight percent, preferably 1-5 weight percent.

$Na_2SnO_3X3A_2O$-stannate used as an admixture for inhibition of reaction of corrosion of anode with concentration 0.01-1.5 weight percent preferably 0.01-1.0 weight percent.

In $(OH_3)$-indium hydroxide used as an admixture for inhibition of reaction of corrosion of anode with concentration 0.1-10 weight percent, preferably 1.10 weight percent.

LiOH lithium hydroxide used as an admixture for increasing electrical conductivity of the electrolyte with concentration 0.1-10 weight percent, preferably 1-10 weight percent. The components are manufactured for example by Sigma Aldrich.

To prepare the electrolyte 17 grams of $Na_2SnO_3X3A_2O$ are dissolved in 500 milliliter of water, then 5 grams $CH_2OHCH_2OH$ are added, then 10 gram C6H12O6 are added, the 15 gram of In $(OH_3)$ and 10 gram of LiOH are added, and then 168 gram of KOH and 40 gram NaOH are added, and to thusly obtained solution water is added to total volume of the solution 1000 milliliter, and mixed to complete absence of the deposit. Thereafter the solution is ready to be used in a fuel cell as an electrolyte.

Figure 3:
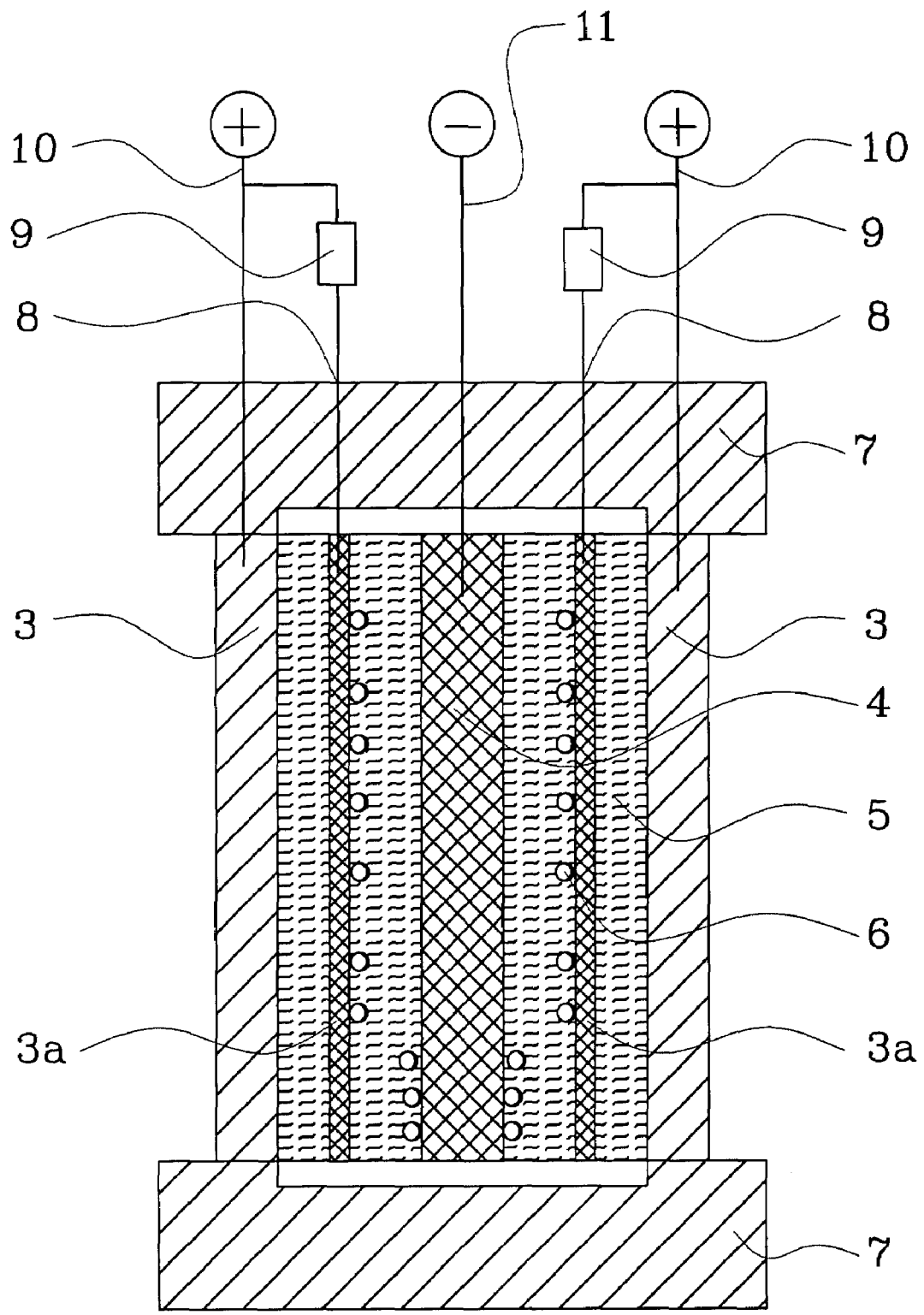
FIG. 3 is a view showing an additional hydrogen electrode of the inventive metal-air fuel cell.

In accordance with the present invention, the metal-air fuel cell of the present invention is provided with an additional electrode which is a hydrogen electrode shown in FIG. 3. It is used for utilization of hydrogen which is generated as a result a corrosion reaction which takes place on the anode. The additional electrode is located between the cathode 3 and the anode 4 and can be configured as a catalyzed gas diffusion electrode based on gas diffusion media as disclosed in application Ser. No. 11/322,195 incorporated here by reference. The hydrogen-generating reaction of the surface of the anode or the corrosion reaction is as follows.

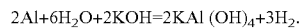

$2Al+6H_2O+2KOH=2KAl(OH)_4+3H_2$.

The reaction of utilization of hydrogen is as follows:

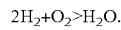

$2H_2+O_2>H_2O$.

Oxygen which is necessary for this reaction is supplied from surrounding air or a special storage system.

The cathode in FIG. 3 is identified with reference numeral 3. The additional electrode is identified with reference numeral 3a, and the anode is identified with reference numeral 4, the electrolyte is identified with reference numeral 5, air bubbles are identified as 6, and lower and upper covers are identified with reference 7. The additional electrode has a current pickup 8. An electrical resistance is 9. The cathode has a current pickup 10 and the anode has a current pickup 11.

Hydrogen which is generated in form of bubbles 6 on the surface of the anode 4 in presence of the electrolyte 5 interacts with the surface of the additional electrode 3a. In the beginning it is absorbed on the surface of the electrode, and then ionized and oxidized with formation metal of water.

Figure 4:
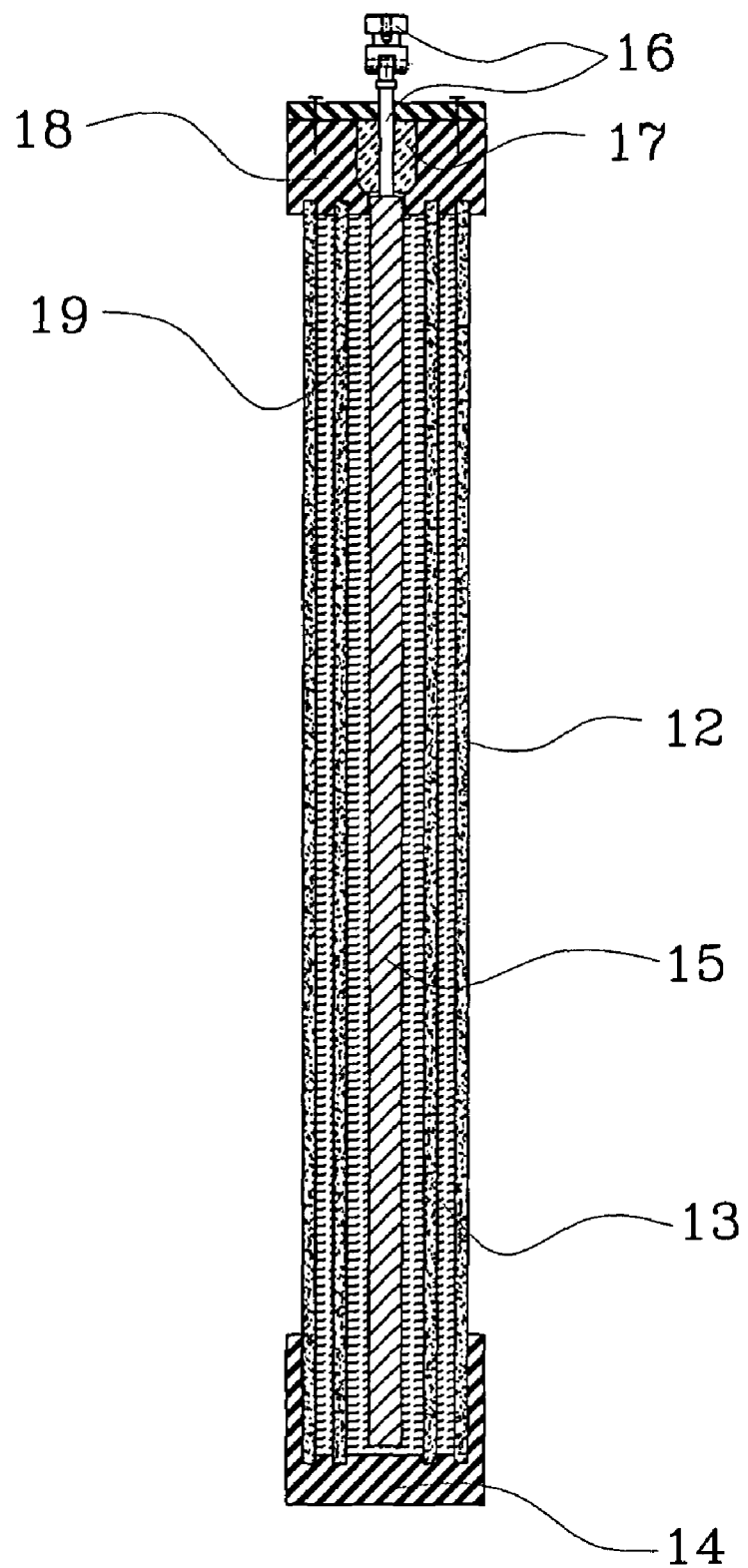
FIG. 4 is a view showing a configuration of a separate metal-air element of the metal-air fuel cell.

FIG. 4 shows a design of a separate metal-air element. It has a cathode 12, an electrolyte 13, a lower assembly plate 14, an anode 15, an anode pickup 16, an anode seal 17, an upper assembly plate 18, and an additional electrode 19. The main part of the element is the cathode 12 which is composed as a frameless box, that is glued or molded into the upper and lower plastic plates 18 and 14 so as to maintain the required distance between the plates. The anode 15 is an element to be spent. When the anode is to be replaced, it is introduced together with the pickup 16 with the use of the sealed annular rubber through the upper assembly plate 18. The additional electrode 19 which is used for utilization of the hydrogen generated as a result of the corrosion reaction of metal (aluminum) is arranged between the anode and cathode and also fixed between the upper and lower assembly plates.

Figure 5:
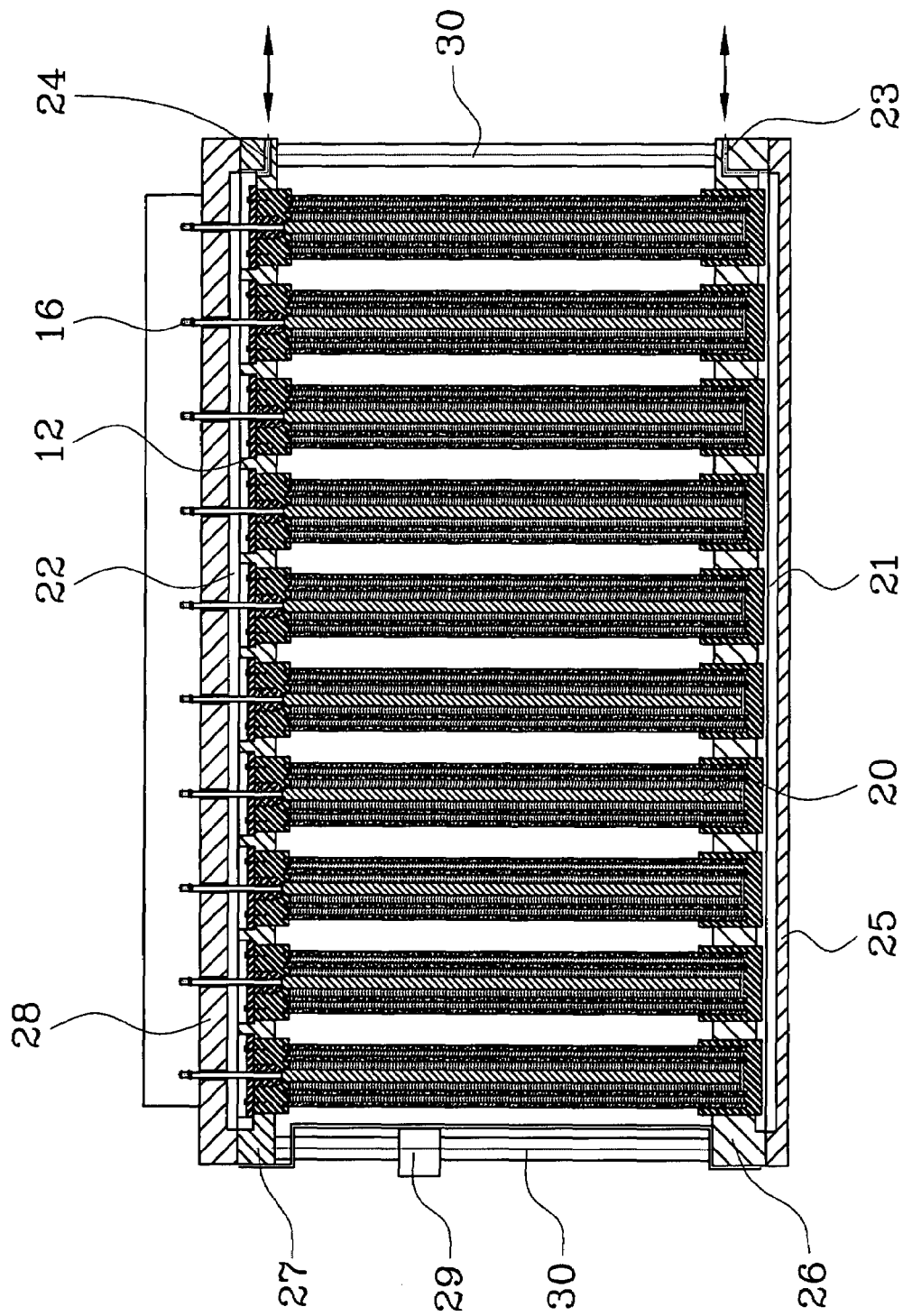
FIG. 5 is a view showing a battery of the metal-air elements of the metal-air fuel cell.

A battery of the metal-air elements is shown in FIG. 5. It includes ten elements 20, a lower distributing collector of electrolyte 21, an upper distributing collector of electrolyte 22, a lower pipe 23 for circulation of electrolyte, an upper pipe 24 for circulation of electrolyte. It further has a lower sealing plate 25, a lower assembly plate 26, an upper assembly plate 27, and an upper sealing plate 28. An electrical output 29 for power pickup from the battery 29 is provided. Reference numeral 30 identifies threaded pins for fixing the distance between the upper and lower assembly plates.

The upper assembly plate 27 performs the functions of fixing and sealing of the cathodes 12 with their pickups, fixing and sealing of the anodes 15 with their pickups 16, collection of electrolyte from each element of the battery 20, and its supply to an electrolyte container through the opening 24. The lower plate 26 perform the functions of fixing and sealing of the cathodes 12, receiving of electrolyte from the container through the opening 23, and supplying it into each element 20 of the battery. For providing a uniformity of the electrolyte flow in each elements, the lower distributing collector 21 and the upper distributing collector 22 for the electrolytes are provided. All elements are connected electrically in series to the common electrical outlet 29.

Figure 6:
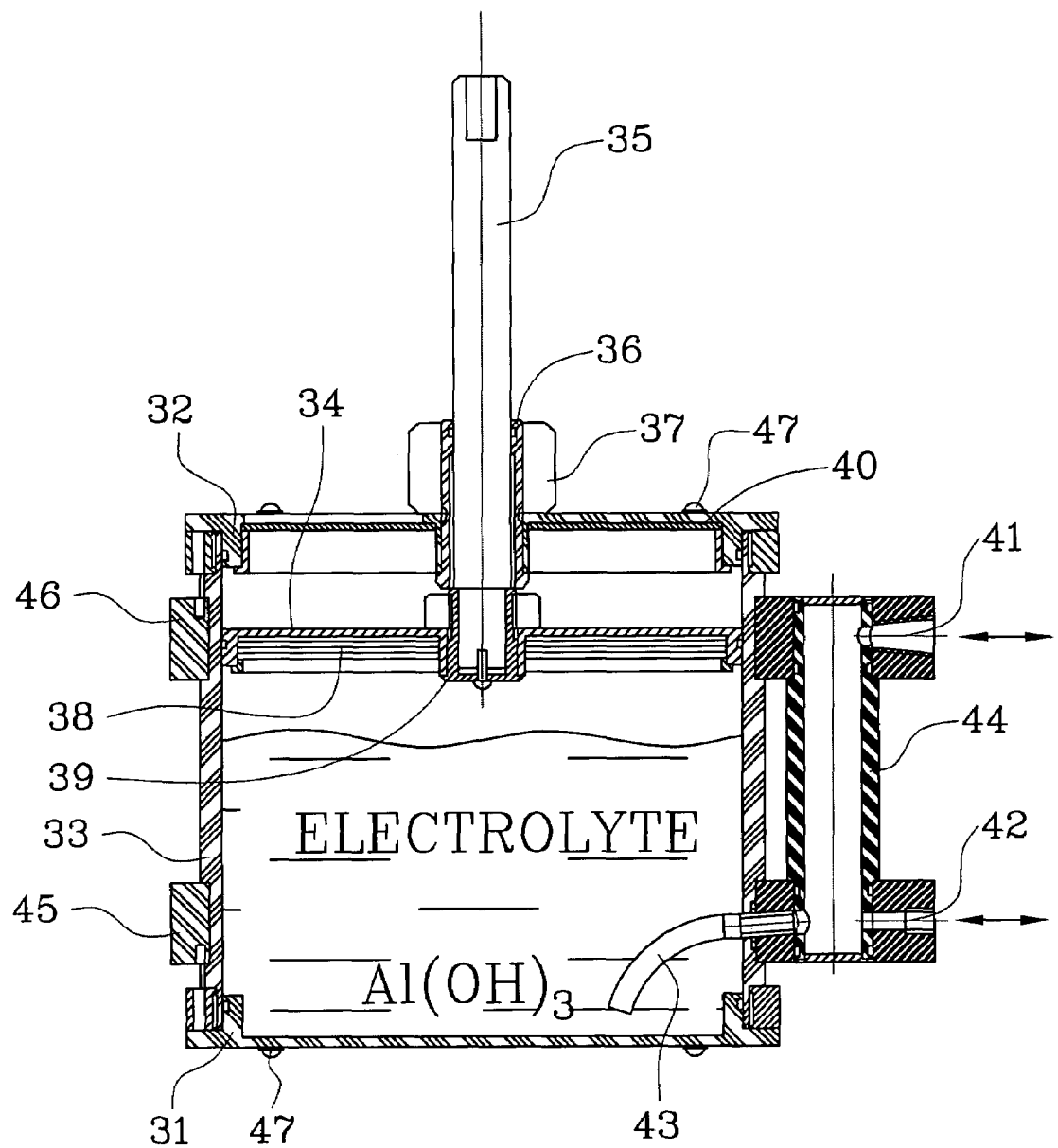
FIG. 6 is a view showing an electrolyte cartridge in accordance with the present invention.

FIG. 6 shows an electrolyte container or cartridge. It has a cylindrical casing 33, a lower removable cover 31, an upper removable cover 32, a piston 34 with a plunger 35 and a seal 36, and a fixing element 37 for the piston. The cartridge is further provided with a catalized membrane 38 for utilization of hydrogen. The membrane-piston unit is fixed by a fixing element 39. An additional catalyzed membrane 40 is also provided. Reference numeral 41 identifies an opening for electrolyte entry into the battery, and reference numeral 42 identifies an opening for electrolyte exit from the container into the battery. A distributing pipe of the electrolyte is identified as 43, a connecting electrolytic collector is 44, and reference numerals 45, 46, 47 identify fixing elements.

The fixing elements are provided for connection of quick connectors to connect the container with battery or to disconnect the container from the battery during recharging. The lower removable cover is provided for removing of products of dissolving of anodes (wastes) from the cartridge after its replacement. The piston supplies the electrolyte into the battery or withdraws electrolyte from the battery during startup or stop. The upper removable cover which contains the catalyzed membrane formed as a gas diffusion electrode (single layer) based on the gas diffusion media as disclosed in application Ser. No. 11/322,195 which is incorporated here by the reference, is provided for afterburning of residual hydrogen which is introduced from the battery into the electrolyte container.

Figure 7:
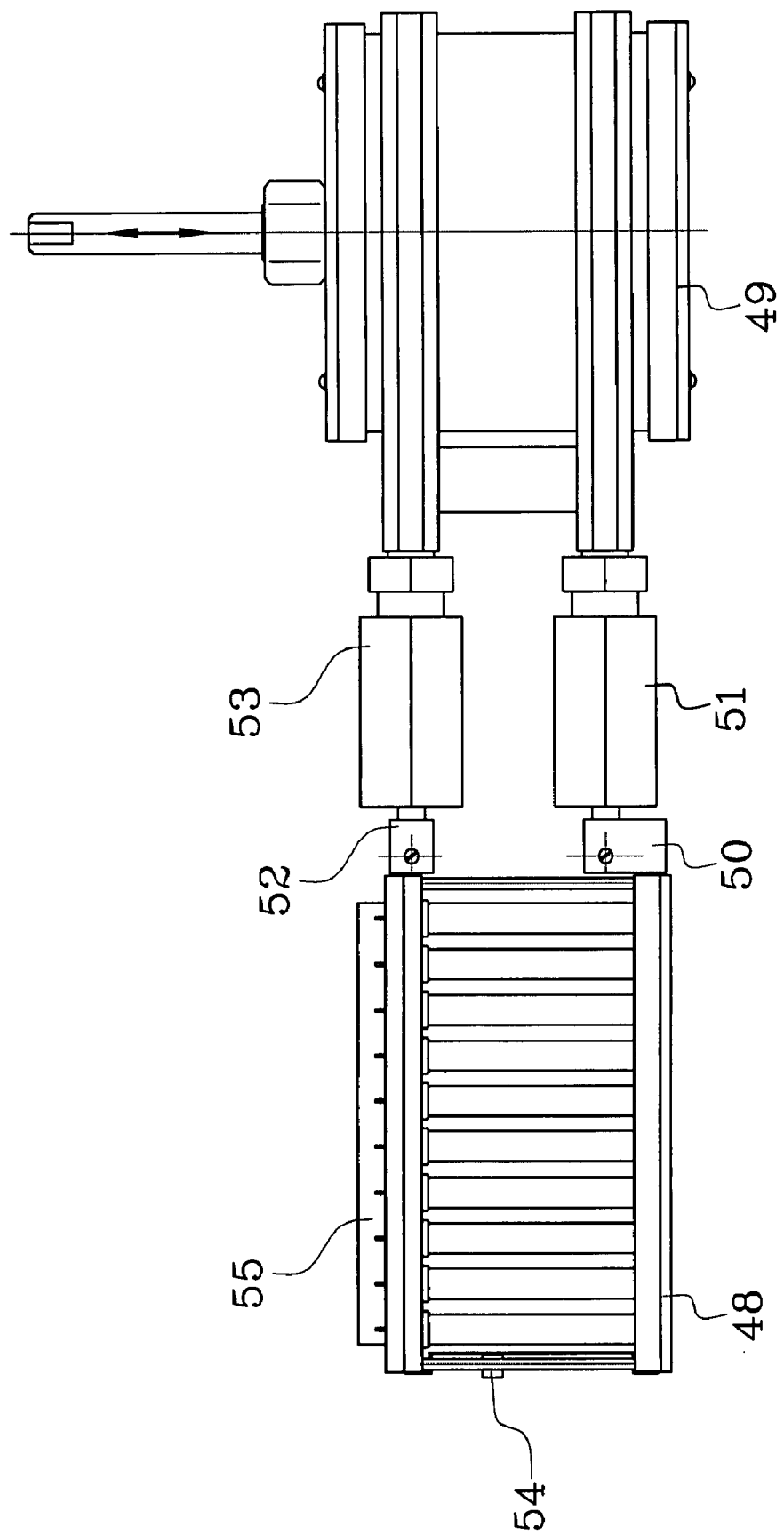
FIG. 7 is a view showing a power source for the metal-air fuel cell in accordance with the present invention.

FIG. 7 illustrates a power source which includes all above mentioned elements. This figure shows a metal air-(aluminum-air) battery 48 and an electrolyte container 49. Reference numerals 50 and 52 identify adaptors for quick connects. Reference numerals 51 and 53 identify quick connectors for electrolytic contour (circuit). The power source further has an electrical output 54 and a protective panel for electrical connections 55.

It will be understood that each of the elements described above, or two or more together, may also find a useful application in other types of constructions differing from the type described above.

While the invention has been illustrated and described as embodied in an aluminum-air fuel cell and a power source therefor, it is not intended to be limited to the details shown, since various modifications and structural changes may be made without departing in any way from the spirit of the present invention.

Without further analysis, the foregoing will so fully reveal the gist of the present invention that others can, be applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A metal-air fuel cell, comprising electrodes including a cathode and an anode; current pickups provided for each of said electrodes for taking currents from a respective one of said electrode, wherein said cathode is a single cathode of the metal-air fuel cell and is formed as a frameless box-shaped element, wherein said box-shaped element has only one longitudinal wall and only one transverse wall which are hermetically connected with one another with interposition of a hermetic connecting layer, wherein said box shaped element has another longitudinal wall and another transverse wall, wherein said one longitudinal wall, said another transverse wall, and said another longitudinal wall are of one piece with one another, so that said hermetic connecting layer is provided only between said one longitudinal wall and said one transverse wall of said box-shaped element.

2. A metal-air fuel cell as defined in claim 1, wherein at least one of said electrodes is provided with a pickup supporting projection, said current pickup of said one element being configured so that it is fittable on said projection and removable from said projection.

3. A metal-air fuel cell as defined in claim 1; and further comprising assembly plates for assembling the cell, said at least one electrode being fixedly connected with one of said assembly plates.

4. A battery, comprising a plurality of metal-air cell elements as defined in claim 1.

5. A battery as defined in claim 4; and further comprising upper and lower distributing collectors for electrolyte; upper and lower pipes for circulation of electrolyte; upper and lower assembly plates; and an electrical element for taking power from the battery.

6. A metal-air fuel cell as defined in claim 1, and an electrolyte container provided for supplying an electrolyte.

7. A metal-air fuel cell as defined in claim 6, wherein said container includes a casing, upper and lower removable covers, catalyzed membranes for utilization of a hydrogen; a membrane-piston unit; a connecting electrolytic connector; and inlet and outlet openings for electrolyte.

8. A metal-air fuel cell as defined in claim 1, wherein edges of said one longitudinal wall and said one transverse wall are extended in one direction so as to be parallel to one another, and said hermetic connecting layer is provided at an end side of said edges.

9. A metal-air fuel cell as defined in claim 1, wherein an edge of said one longitudinal wall is extended in one direction, while an edge of said one transverse wall extends in a same one direction and then surrounds said edge of said one longitudinal wall, and said hermetic connecting layer is provided between said edges.

10. A metal-air fuel cell, comprising electrodes including a cathode and an anode; current pickups provided for each of said electrodes for taking currents from a respective one of said electrode, wherein said cathode is a single cathode of the metal-air fuel cell and is formed as a frameless box-shaped element having only one longitudinal wall and only one transverse wall hermetically connected with one interposition of a hermetic connecting layer, wherein said box shaped element has another longitudinal wall and another transverse wall, wherein said one longitudinal wall, said another transverse wall, and said another longitudinal wall are of one piece with one another, so that said hermetic connecting layer is provided only between said one longitudinal wall and said one transverse wall of said box-shaped element; and an additional hydrogen electrode provided for utilization of hydrogen generated as a result of a corrosion reaction on said anode, wherein said additional electrode is located between said cathode and said anode.

11. A metal-air fuel cell as defined in claim 10, wherein edges of said one longitudinal wall and said one transverse wall are extended in one direction so as to be parallel to one another, and said hermetic connecting layer is provided at an end side of said edges.

12. A metal-air fuel cell as defined in claim 10, wherein an edge of said one longitudinal wall is extended in one direction, while an edge of said one transverse wall extends in a same one direction and then surrounds said edge of said one longitudinal wall, and said hermetic connecting layer is provided between said edges.

\* \* \* \* \*